United States Patent [19]

Lizmore

[11] Patent Number: 4,636,233
[45] Date of Patent: Jan. 13, 1987

[54] FILTER ASSEMBLY

[75] Inventor: George Lizmore, London, Canada

[73] Assignee: Lawson & Jones Limited, Mississauga, Canada

[21] Appl. No.: 467,067

[22] Filed: Feb. 16, 1983

[51] Int. Cl.$^4$ ............................................. B01D 46/10
[52] U.S. Cl. ........................................ 55/501; 55/511;
55/DIG. 31; 229/172; 229/176; 229/192
[58] Field of Search ................. 55/501, 511, DIG. 31;
40/154, 156; 229/34 B, 34 HW, 35; 160/377;
52/656, 658

[56] References Cited

U.S. PATENT DOCUMENTS

| Re. 25,050 | 10/1901 | Hamilton | 229/34 HW |
|---|---|---|---|
| 3,970,440 | 7/1976 | Copenhefer et al. | 55/501 |
| 4,105,423 | 8/1978 | Latakas et al. | 55/501 |
| 4,210,067 | 7/1980 | Evans, Jr. | 55/DIG. 31 |
| 4,372,763 | 2/1983 | Champlin et al. | 55/DIG. 31 |

FOREIGN PATENT DOCUMENTS

| 1116896 | 5/1956 | France | 229/34 HW |
|---|---|---|---|
| 1348138 | 11/1963 | France | 229/34 HW |
| 422635 | 4/1966 | Switzerland | 229/34 HW |

Primary Examiner—David L. Lacey
Attorney, Agent, or Firm—Hirons, Rogers & Scott

[57] ABSTRACT

A filter assembly includes a casing having a support panel to support the filter element and upstanding walls extending around the periphery of the casing. The corners between the walls are reinforced by a pair of tabs extending, each extending from a respective one of the walls and co-operating with the other wall to provide a double layer of reinforcement. The walls are inclined to the support panel to permit nesting of the casings during transport.

10 Claims, 7 Drawing Figures

FILTER ASSEMBLY

The present invention relates to filter assemblies for use in heating and ventilating equipment and in particular to the casing for such filters.

It is common to provide heating and ventilating equipment in which air is circulated through a filter to remove impurities. These filters are designed to be changed periodically and as such their retail cost should be maintained at a minimum. The conventional filter is formed with a filter element located within a casing. The casing is in the form of a sleeve with holes on either side of the sleeve to allow air to pass through. Such an arrangement of filter while almost universally accepted is labour intensive to manufacture and expensive to transport because of the bulk with minimum weight thereby leading to an increase in retail cost.

Filters have been proposed that utilize a single sided support with upstanding walls around the periphery of the support to allow nesting of the filters during transport. Such proposals have however been unsuccessful because the walls, and in particular the corners have tended to be too weak and have split either during use or transport.

It is therefore an object of the present invention to obviate or mitigate the above disadvantages.

According therefore to the present invention there is provided a filter assembly comprising a filter element, a planar rectangular support panel which supports the filter element, upstanding outwardly flared walls extending around periphery of the support panel, each pair of adjacent walls meeting at a corner and having reinforcing means extending between adjacent walls to interconnect them, and each of said walls being formed from material folded back on itself to provide a pair of contiguous layers of material, with opposed surfaces in contact over a substantial portion of each of the said walls, said reinforcing means comprising a first tab extending from a first of said walls between the layers of a second of said walls retaining in engagement, and a second tab extending from a second of said walls between the layers of the first of said walls, said first and second tabs being held between layers to prevent separation of said walls at said corner.

According further to the present invention there is provided a method of reinforcing a corner of a filter assembly formed from a blank having a support panel, a wall member extending from each edge of said support panel with each wall member having first and second panels connected in seriatim with said support panel, the first panel of a pair of wall members disposed on opposite sides of said support panel having a tab extending from each end thereof, the method comprising the steps of folding each of said tabs out of the plan of said blank, erecting said wall members to bring each of said tabs into engagement with the first panel of an adjacent wall member, folding said second panel of said adjacent wall member over said first panel to trap said tab between said panels and folding said second panel of said one wall over said first panel of said one wall.

An embodiment of the invention will now be described by way of example only with reference to the accompanying drawings in which.

Figure 1:
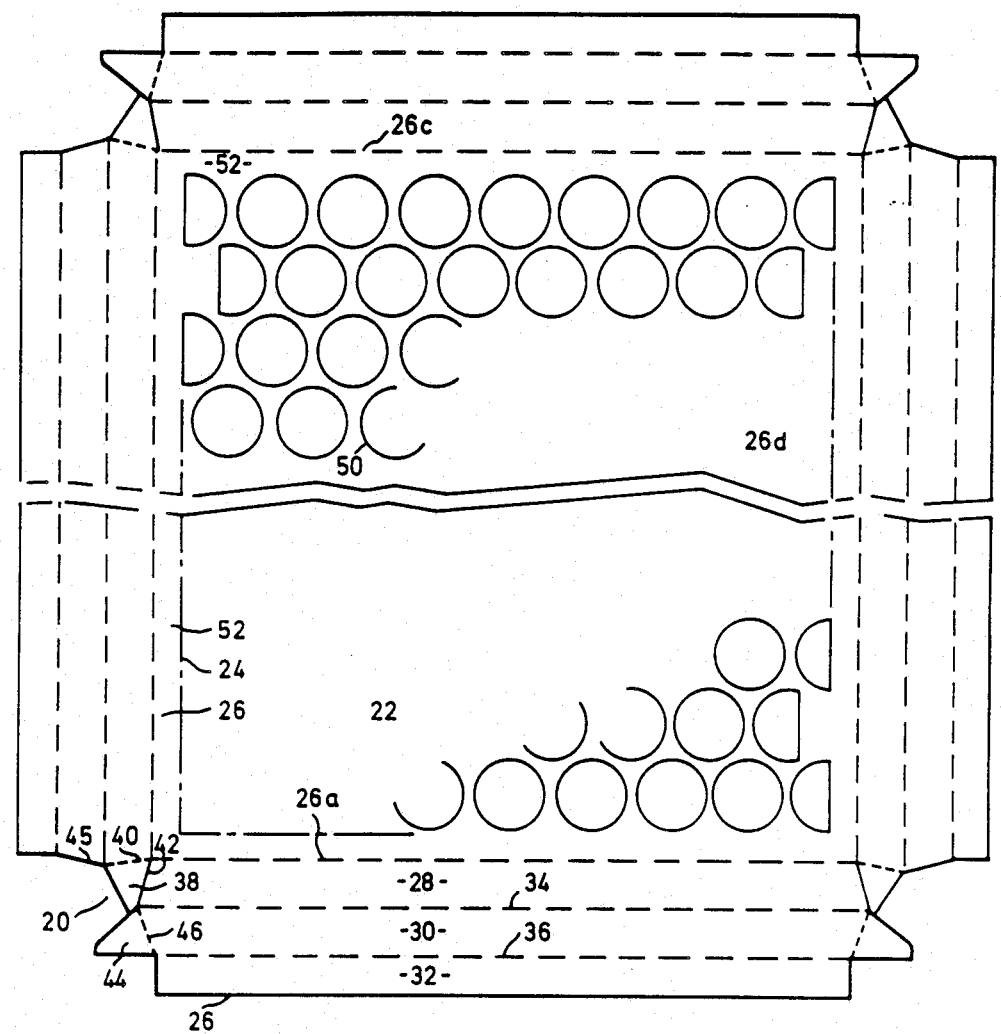
FIG. 1 is a view of a blank for forming a filter casing.

Referring now to FIG. 1 the blank generally designated 20 includes a support panel 22 having edges 24 defined by fold lines with wall members generally denoted 26 and individually identified as 26A, 26B, 26C, 26D extending from each edge 24. The support panel 22 is formed with a series of perforations 50 that terminate at a marginal zone 52 adjacent the edges 24. Each of the wall members 26 comprises first, second and third panels 28, 30, 32 respectively arranged in seriatim with the panels 28, 30 connected along a fold line 34 and the panels 30, 32 connected along a fold line 36.

Each end of the first panels 28 of the wall members 26B and D has a first tab 38 extending therefrom as a continuation of the panel. The tab 38 is connected to the first panel 28 along a fold line 40 that is inclined to the edge 24. The first tab 38 is delimited by a cut line 42 that also defines the end of the first panel 28 of the wall members 26A and C.

Each end of the second panel 30 of the wall members 26A and 26C is provided with a second tab 44 extending as a continuation of the panel and connected to the second panel 30 along fold line 46. The fold line 46 is also inclined to the edge 24 but in an opposite direction to that of the cut line 42 delimiting the first panel.

The ends of the second panel 30 in wall members 26B and 26D are defined by cut lines 48 that are inclined to the edge 24 at an equal but opposite angle to the inclination of the fold line 40.

A filter assembly is formed from the blank by first folding the first tabs 38 out of the plane of the blank 20. Glue is applied to the panels 32 and the wall members 26 erected by folding about the fold line 24 until the cut line 42 and the fold line 40 are coincident. Because of the inclination of the lines 42, 40 to their respective edges, the walls are outwardly inclined from the support panel 22.

Figure 2:
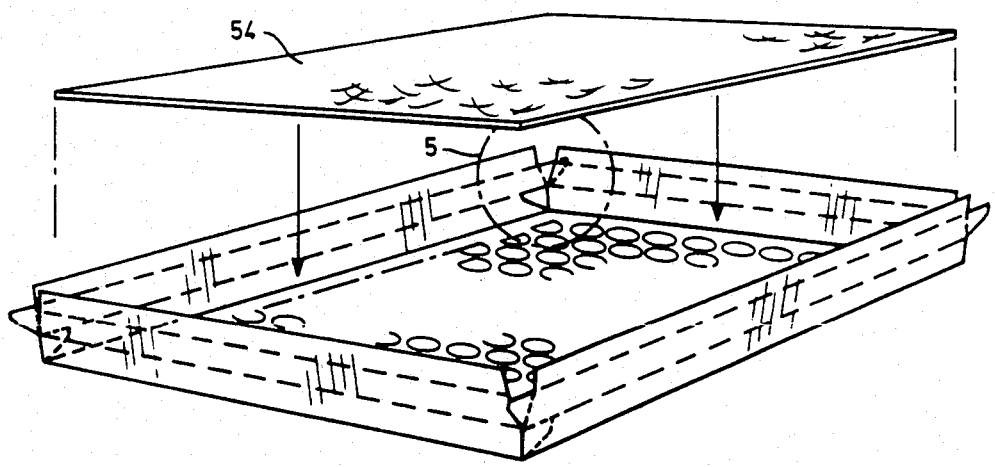
FIG. 2 is a view of the partially erected blank of FIG. 1 with a filter element being installed.

In this position the first tab 38 lies along the interior of the first panel 28 of the adjacent wall member as shown in FIG. 2. A filter element 54 is placed on the support panel 22 as indicated by the arrows in FIG. 2. The filter element 54 may be any suitable material such as a mineral wool or glass wool in sheet form.

Figure 3:
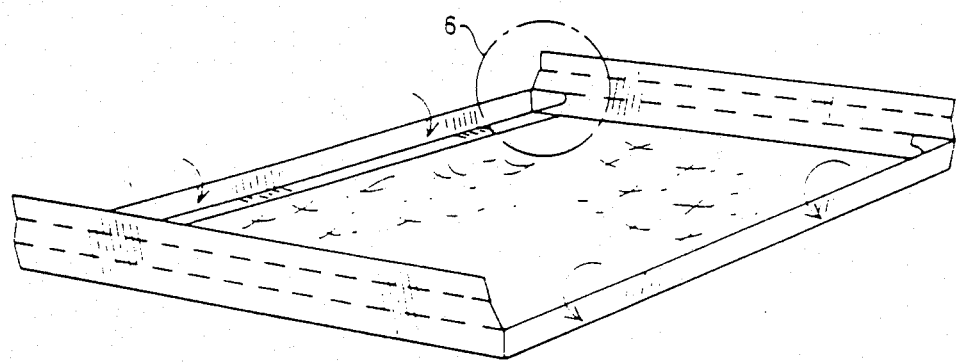
FIG. 3 is a view of the continuing assembly of the casing to secure the element.
Figure 4:
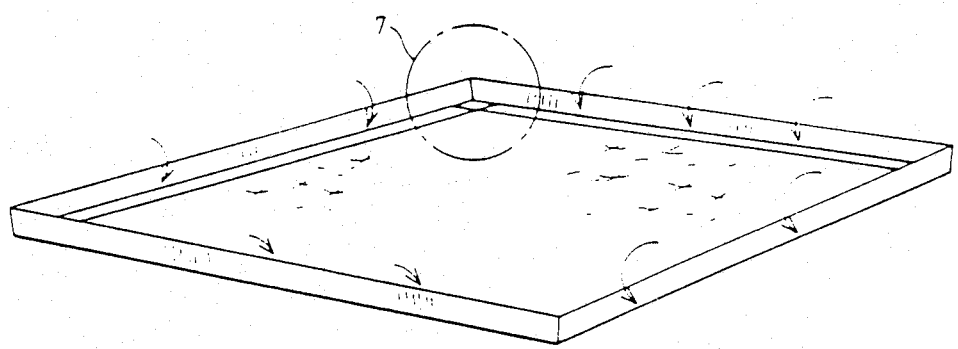
FIG. 4 is a view showing the completion of the assembly of the filter casing.
Figure 5:
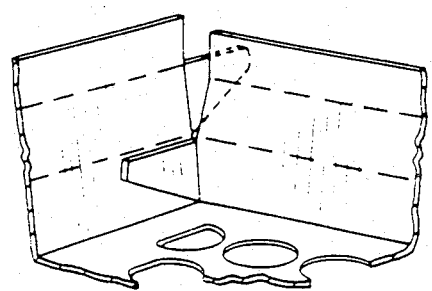
FIG. 5 is a detailed view showing a corner of the casing in the condition shown in FIG. 2.
Figure 6:
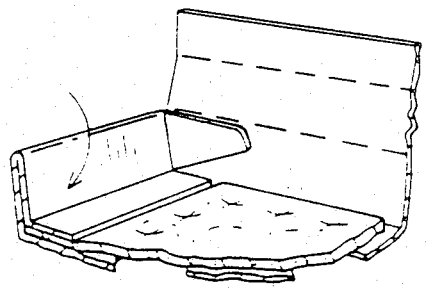
FIG. 6 is a detailed view of the corner of the casing in the condition shown in FIG. 3 and, FIG. 7 is a detailed view of the corner of the casing in the condition shown in FIG. 4.
Figure 7:
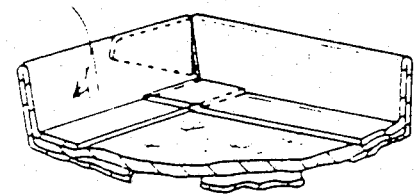

To secure the element 54 against the panel 26 the wall members 26A and D are folded about the line 34 so that the panel 30 overlies the panel 28. As this folding occurs the second tabs 44 abut the cut lines 48 of the adjacent panel and are folded about the fold line 46 so that they lie against the interior surface of the first panel 28. At the same time the third panel 32 engages the upper surface of the element 54 that is folded about the line 36 so that it overlies the marginal zone 52 as shown in FIG. 3. The glue applied to the panel 32 is effective to hold the panels in their folded condition. As the folding of the wall members 26A and C occurs the first tab 38 is trapped between the panels 28–30 and firmly held by friction.

The abutment of the second flap 44 against the cut line 48 during folding of the wall members 26A, C causes the tab 44 to fold about the fold line 46 and be brought into register against the panel 28 of the walls 26B, 26D. These walls 26B, D are then folded about their fold line 34 to bring the second panel 30 over the first panel 28 and trap the second tab 44 between the two panels. The flap 32 is also brought into engagement with the upper surface of the element 54 with the glue holding the flap in position.

With the folding technique described above it can be seen that the corners of the filter element are reinforced by two layers of material. Moreover the material is held in such a way that as force tending to pull one of the tabs 38, 44 out from between the panels 28, 30 is counteracted by the connection of the second of the tabs to its respective panel. The arrangement of the tabs is such that the first tab is associated with the first panel and the second tab associated with the second panel facilitates automatic folding of the assembly and thereby reduces the labour content of the assembly procedure.

The inclination of the cut lines 42 and fold lines 40 and 46 to the periphery of the support panel 22 provides an included angle of less than 90° between adjacent lateral edges defined by lines 40, 42 and ensures that the walls 26 taper toward the support panel so that the filters may be nested one within the other. This reduces the volume of the filters during transport and thereby increases the number of filters that may be transported at any one time.

It will be seen therefore that the above invention provides a filter assembly which may be produced from a one piece blank with a minimum of labour whilst at the same time producing a strong nestable filter assembly.

It will be appreciated that the erecting, glueing and folding of the blank 20 may be accomplished automatically by conventional folding machinery thereby avoiding manual assembly.

The embodiments of the invention in which an exclusive property or privilege is claimed are defined as follows:

1. A filter assembly comprising a filter element, a planar rectangular support panel which supports said filter element, upstanding, outwardly flared walls extending around the periphery of said support panel, each pair of adjacent walls meeting at a corner and having reinforcing means extending between adjacent walls to interconnect them, and each of said walls being formed from material folded back on itself to provide a pair of contiguous layers of material, with opposed surfaces in contact over a substantial portion of each of said walls, said reinforcing means comprising a first tab extending from a first of said walls between the layers of a second of said walls, and a second tab extending from a second of said walls between the layers of the first of said walls, said first and second tabs being held in retaining engagement with said opposed surface of the respective walls to prevent separation of said walls at said corner.

2. A filter assembly according to claim 1 wherein each of said walls is formed from a pair of interconnected panels joined along a common edge, with one of said panels being connected to the periphery of said support panel along an edge parallel to said common edge, said first tab extending from each end of the first panel of said first wall and said second tab extending from each end of a second panel of said second wall, said panels being folded about said common edge to provide said pairs of contiguous layers of materials.

3. A filter assembly according to claim 2 wherein each of said walls has a third panel connected to said second panel along an edge thereof opposite to said common edge, said third panel having been folded about said edge opposite to said common edge such that said third panel overlies a portion of the periphery of said support panel.

4. A filter assembly according to claim 3 wherein said third panel is positioned to retain said filter elements on said support panel.

5. A filter assembly according to claim 1 wherein the interconnection between said tabs and respective panels is along a fold line inclined to said common edge, said walls thereby being inclined to said support panel to permit nesting of one filter assembly within another.

6. A blank for forming a nestable casing for a filter assembly, said blank comprising generally rectangular support panel, wall members extending along each edge of said support panel, each of said wall members comprising a first panel connected to said support panel along an edge thereof, a second panel connected to said first panel along a fold line disposed parallel to the respective edge of said support panel, each of said first and second panels being delimited at either end by respective lateral edges, said respective lateral edges being equally and oppositely inclined to the associated fold line with the included angle between lateral edges of adjacent ones of said first panels being less than a right angle, said second panel being foldable about said fold line to overlie said first panel to provide a wall formed from a plurality of contiguous layers of material, said first panel of one of said walls having a first tab extending from each end thereof and said second panel of a wall adjacent said one wall having a second tab extending from each end thereof, said first and second tabs each having an outer edge whereby upon erecting said blank the lateral edges are brought into abutment to provide upstanding walls around the periphery of said support panel, and each of said tabs is located and held between the panels of the adjacent wall with said outer edges lying adjacent to said fold line.

7. A blank according to claim 6 wherein said first tab is delimited by a cut line defining the lateral edge of the first panel of the adjacent wall.

8. A blank according to claim 6 wherein each wall member includes a third panel connected to said second panel along a common edge parallel to the edge of said support panel.

9. A blank according to claim 8 wherein said support panel is perforated to permit passage of air therethrough.

10. A blank according to claim 9 wherein a peripheral margin of said support panel is not perforated to provide uniform support for said third panel upon erection of said blank.

* * * * *